(12) United States Patent
Sennett

(10) Patent No.: US 6,637,640 B1
(45) Date of Patent: Oct. 28, 2003

(54) PIPE WELDING TOOL

(76) Inventor: Kenneth Sennett, 3190 Eastex Freeway #227, Beaumont, TX (US) 77703

( * ) Notice: Subject to any disclaimer, the term of this patent is extended or adjusted under 35 U.S.C. 154(b) by 0 days.

(21) Appl. No.: 10/179,836

(22) Filed: Jun. 24, 2002

(51) Int. Cl.⁷ .............................. B23K 37/00; B23K 1/20
(52) U.S. Cl. ........................................ 228/44.3; 228/17
(58) Field of Search ............................... 228/4.1, 15.1, 228/17, 25, 27, 44.3, 44.5, 212; 219/61–61.2, 75

(56) References Cited

U.S. PATENT DOCUMENTS

| | | | | |
|---|---|---|---|---|
| 4,053,973 A | * | 10/1977 | Meli ............................ | 29/252 |
| 4,179,059 A | * | 12/1979 | Chang et al. ................ | 228/103 |
| 4,306,134 A | * | 12/1981 | Slavens et al. ............. | 219/60 A |
| 4,436,974 A | * | 3/1984 | Lebedev et al. ............. | 219/66 |
| 4,708,279 A | * | 11/1987 | Dearman ..................... | 228/49.3 |
| 5,090,608 A | * | 2/1992 | Jones ........................... | 228/49.3 |
| 5,099,098 A | * | 3/1992 | Burgoon ...................... | 219/60 A |
| 5,535,938 A | * | 7/1996 | Leduc .......................... | 228/212 |
| 5,583,305 A | * | 12/1996 | Hirsch et al. ............... | 73/885.8 |
| 5,669,547 A | * | 9/1997 | Spring ......................... | 228/219 |
| 5,796,069 A | * | 8/1998 | Jones et al. ............. | 219/121.64 |
| 6,044,769 A | * | 4/2000 | Oka et al. ................. | 104/138.2 |
| 6,070,784 A | * | 6/2000 | Holt et al. ................ | 228/112.1 |

* cited by examiner

Primary Examiner—Tom Dunn
Assistant Examiner—Zidia Pittman
(74) Attorney, Agent, or Firm—Goldstein & Lavas, P.C.

(57) ABSTRACT

A pipe welding tool for delivering inert gas to the interior of pipes being welded. The tool has a center tube and a pair of clamps extending around the tube that support a number of extendible hinged arms. The arms are collapsible, thus allowing the entire tool to adjust to fit within a pipe. Once in the pipe, the arms are released and tensioned against the walls of the pipe. A nozzle is positioned on top of the tube. A quick connect coupling is located at the bottom of the tube and connects with a gas source providing an inert gas. A hose connects the quick connect coupling with the nozzle. A gas lens, connected to the nozzle, has a plurality of holes around its side wall. When the gas is fed into the gas lens, the gas lens releases the gas through the holes in the lens in a 360 degree planar pattern. When positioned within a pair of pipes adjacent to a seam, the tool can serve to provide inert gas to the interior of the pipes and prevent the pipes from burning.

5 Claims, 3 Drawing Sheets

PIPE WELDING TOOL

BACKGROUND OF THE INVENTION

The invention relates to a pipe welding tool. In particular, the invention is a welding tool for use in delivering an inert gas, such as argon gas, to the interior of the pipes to be welded. The tool is anchored within the pipe adjacent to the prospective weld and has a quick connect hose for connection to a gas source.

When welding pipes, it is often difficult to perform the task without burning the interior of the pipes. It is necessary to deliver an inert gas to the area to be welded in order to create a gas shield. The oxygen must be removed from the area to prevent oxidizing of the pipes. Trying to insert a tool inside the pipes could prove to be a dangerous task. Further, it is imperative to remove all oxygen from the weld in a safe and timely fashion.

Thus, there exists a need for a pipe welding tool which may be inserted into a pipe for safe and effective removal of the oxygen from therein. Such a tool should be constructed in such a manner as to allow the welder to easily insert the tool into the pipe and perform the welding task with ease and little danger to himself/herself and those in the vicinity.

U.S. Pat. No. 3,588,427 to Oppenheimer discloses an apparatus for use in high-frequency welding, said apparatus for use in welding together the edges of a longitudinal gap in metal tubing through the use of electromagnetic induction or high frequency resonance heating.

U.S. Pat. No. 4,942,281 to Srba discloses a multi-torch interface assembly for inert gas welding. The interface allows for selection of a plurality of TIG welding torches.

U.S. Pat. No. 5,889,251 to Payne discloses an apparatus for narrow groove welding including a torch assembly with a replaceable gas cup. Different length gas cups can be used for different depth grooves.

While these units may be suitable for the particular purpose employed, or for general use, they would not be as suitable for the purposes of the present invention as disclosed hereafter.

SUMMARY OF THE INVENTION

In view of the foregoing disadvantages inherent in the prior art, the present invention provides an improved pipe welding tool. As such, the general purpose of the present invention, which will be described subsequently in greater detail, is to provide a new and improved pipe welding tool which has all the advantages of the prior art and none of the disadvantages.

To attain this, the present invention essentially comprises a pipe welding tool for delivering an inert gas into the interior of the pipes while said pipes are welded from the outside. The tool has a center tube and a pair of clamps extending around the tube. The clamps support a number of extendible hinged arms. The arms are collapsible, thus allowing the entire tool to adjust to fit within a pipe. Once in the pipe, the arms are released and tensioned against the walls of the pipe so that the tool is wedged within the pipe. A nozzle is positioned on top of the tube. A quick connect coupling is located at the bottom of the tube, and connects with a gas source providing an inert gas. A hose connects the quick connect coupling with the nozzle. A gas lens, mateable with the nozzle, has a plurality of holes around its side wall. When the gas is fed into the gas lens, the gas lens releases the gas through the holes in the gas lens in a 360° pattern. When positioned within a pipe adjacent to a seam, the tool can serve to deliver an inert gas, such as argon, to the interior of the intended pipes.

It is an object of the invention to produce a pipe welding tool that may be inserted into a pipe for delivering an inert gas, such as argon, to the interior. Accordingly, the tool has a central tube and a plurality of foldable anchoring arms. The arms are collapsible to allow for a snug fit within the pipe and a plurality of roller assemblies allow the tool to slide in and out of the pipe with ease.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

Figure 1:
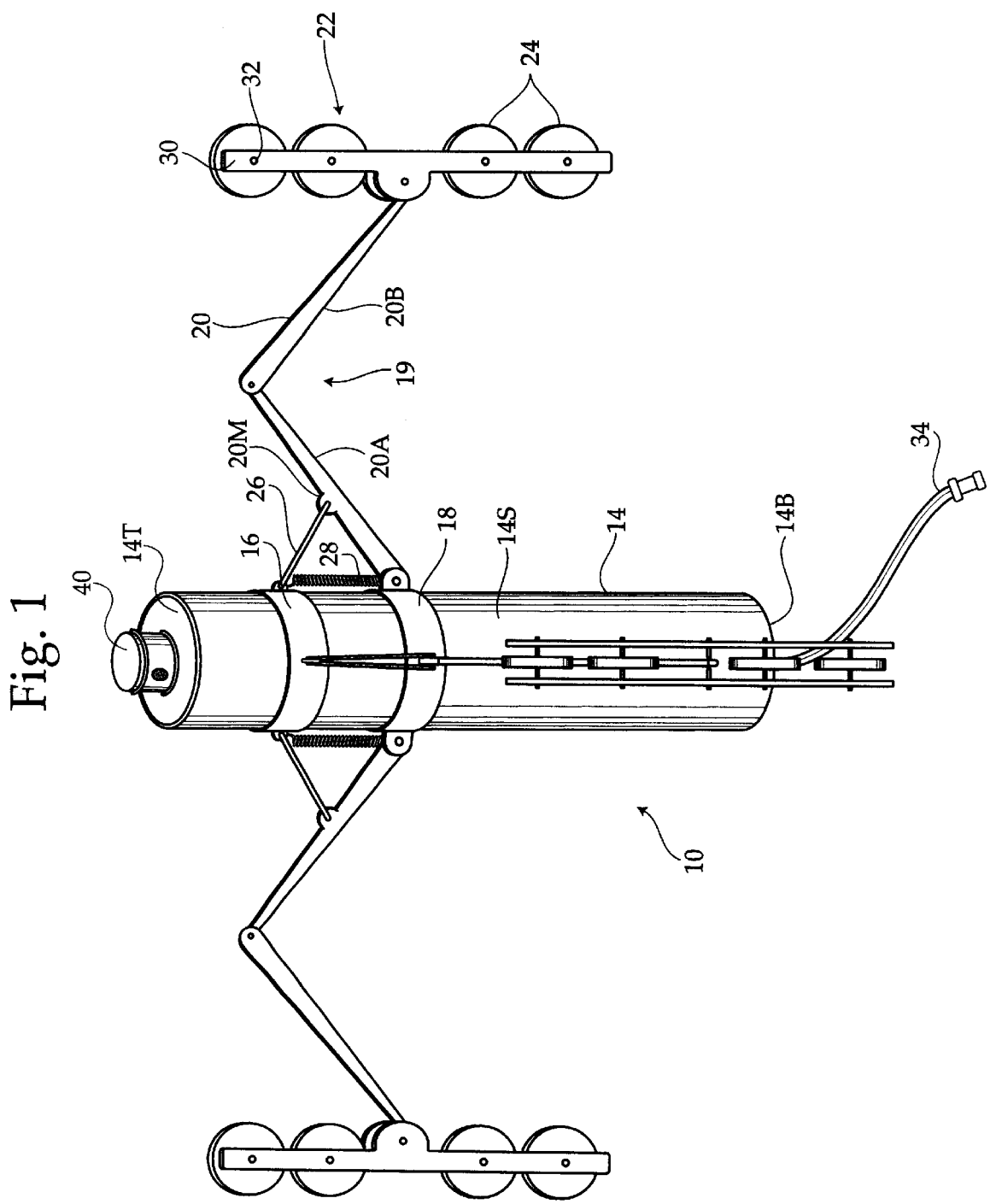
FIG. 1 is a perspective of the pipe welding tool.
Figure 2:
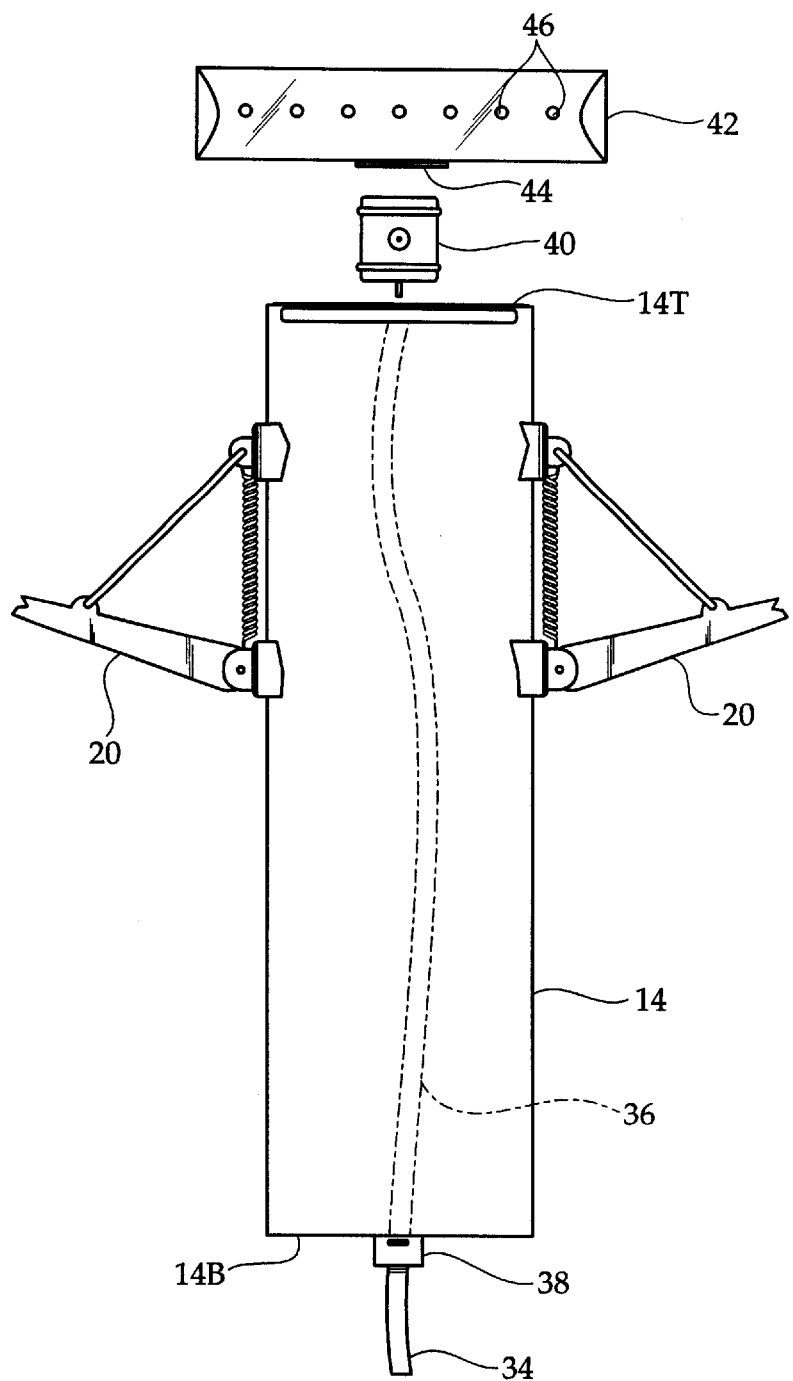
FIG. 2 is an exploded view of the pipe welding tool.

REFERENCE NUMERALS 10 pipe welding tool
12 pipe
12W pipe inside wall
14 center tube
14S side wall of tube
14T top wall of tube
14B bottom wall of tube
16 upper clamp
18 lower clamp
19 wall engaging assembly
20 arm
20A inner arm
20B outer arm
20M midpoint along inner arm
22 roller assembly
24 wheel
26 pivot arm
27 biasing mechanism
28 spring
30 bar
32 axis
34 quick connect coupling
36 hose
38 outlet
39 gas delivery head
40 nozzle
42 gas lens
44 central aperture
46 hole
48 seam

DETAILED DESCRIPTION OF THE PREFERRED EMBODIMENTS

Figure 3:
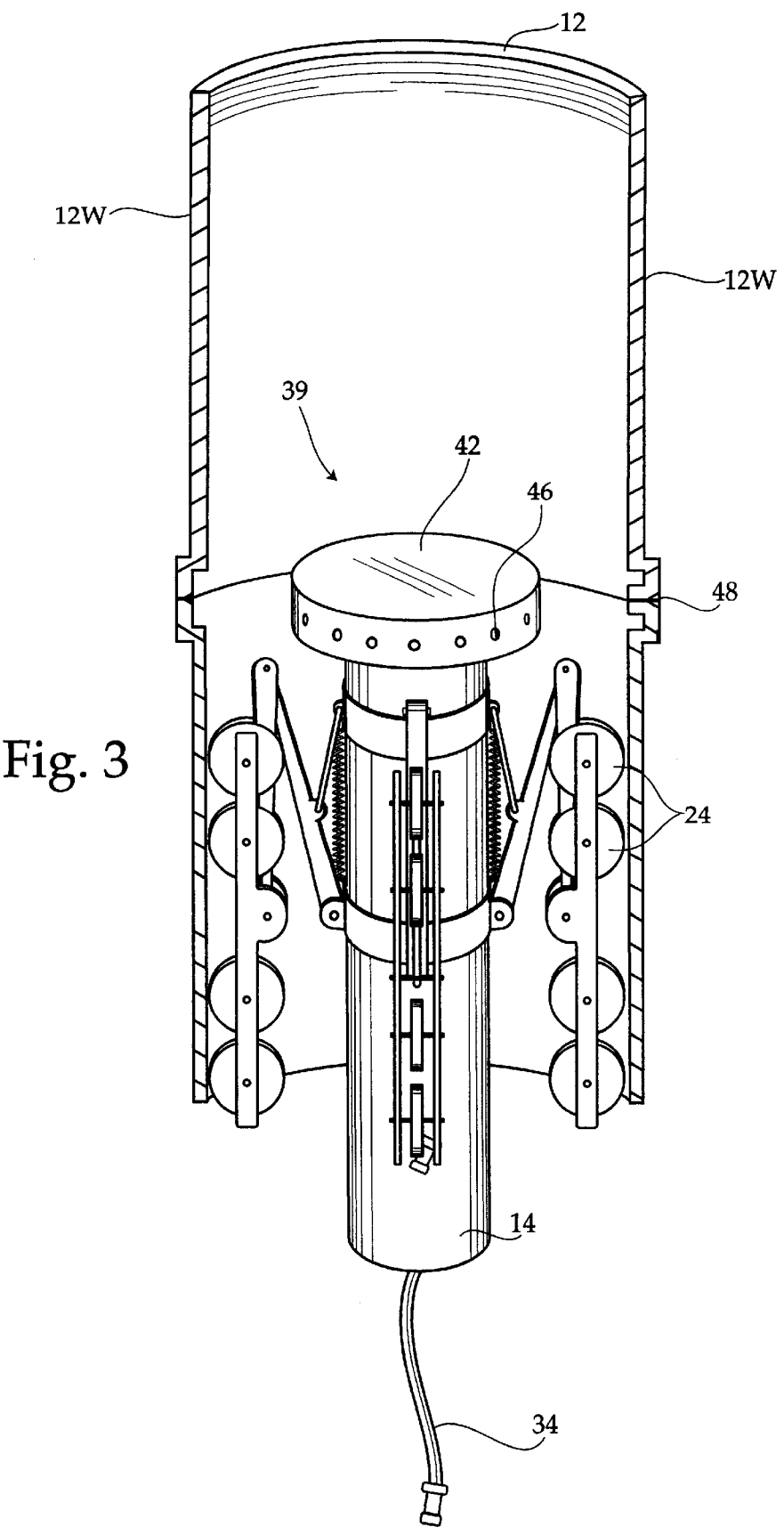
FIG. 3 is a perspective view of the pipe welding tool in place within a pair of pipes to be joined, with the gas lens aligned with the seam.

FIG. 1 illustrates a pipe welding tool 10 for insertion into pipes 12 for the purpose of delivering inert gas into the interior of the pipes 12. Referring momentarily to FIG. 3, each pipe 12 has an inside wall 12W defining an interior volume. When in use, the pipe welding tool 10 is positioned within the interior volume of the pipes 12. In a broad sense, the invention comprises a tube 14, a gas delivery head 39, and two or more wall engaging assemblies 19. The tube 14 is inserted into the pipe 12 to position the gas delivery head 39 for delivery inert gas to an area to be welded, while the wall engaging assemblies 19 extend radially outward from the tube 14 to engage the inside walls 12W of the pipe 12.

The tube 14 has a side wall 14S, a top wall 14T, and a bottom wall 14B. An upper clamp 16 and a lower clamp 18 extend around the side wall 14S, said clamps 16, 18 supporting the wall engaging assemblies 19. The upper clamp 16 is fixed to the tube 14 and the lower clamp 18 is selectively slideable along the tube 14 towards and away from the upper clamp 16. The clamps 16, 18 support the wall engaging assemblies 19.

Each wall engaging assembly 19 essentially comprises a roller assembly 22 having an arm 20 for varying the radial distance between the tube 14 and the pipe inside wall 14W, vertically aligned wheels 24, and a biasing mechanism 27 cooperating with the arm 20 for biasing the roller assembly 22 against the pipe walls 12W.

Each arm 20 has an inner arm 20A and an outer arm 20B, the inner arm 20A hingedly connected to the lower clamp 18 at one end. The opposite end of the inner arm 20A is hingedly connected to one end of the outer arm 20B. The biasing mechanism 27 includes a pivot arm 26 extending from the upper clamp 16 to a midpoint 20M along the inner arm 20A. This pivot arm 26 forces the lower clamp 18 to move downward as the inner arm 20A pivots toward the tube 14. A spring 28 extends from the upper clamp 16, particularly at the point of connection between the pivot arm 26 and the upper clamp 16, to the lower clamp 18, particularly at the point of connection between the arm 20 and the lower clamp 18. The spring 28 runs parallel to the side wall 14S of the tube 14. The spring 28 thereby biases the inner arm 20A outward by pulling the lower clamp 18 upward toward the upper clamp 16 where it is nearly perpendicular to the tube side wall 14S. The roller assembly 22 is attached at the opposite end of the outer arm 20B. Each wheel 24 is positioned between parallel bars 30 and connected thereto through a central axis 32.

When placing the tool 10 within the pipe 12, tension is applied against the roller assembly 22 to cause the arms 20 to collapse towards the tube 14 in order to allow the tool 10 to fit within the interior volume of the pipe 12. Thus, the spring 28 is stretched downward, causing the lower clamp 18 to move away from the upper clamp 16. Since the spring 28 is biased upward, once the roller assembly 22 is released, the spring 28 contracts, thereby causing the pivot arm 26 to push the inner arm 20A outward. This outward movement pushes the roller assembly 22 outward towards the pipe inside wall 12W. Once the wheels 24 engage the wall 12W of the pipe 12, the arms 20 are tensioned against the wall 12W of the pipe 12. The entire tool 10 may be easily moved upward or downward within the pipe 12 by pushing or pulling said tool 10, the wheels 24 rolling against the pipe inside wall 12W. The tool 10 is adjusted within the pipe 12 so that the welding head 39 is aligned with the pipe seams 48.

A hose 36 extends from the top wall 14T of the tube 14 down to the bottom wall 14B, at which point the hose 36 exits the tube 14. An outlet 38 in the bottom wall 14B provides an exit point for the hose 36. A quick connect coupling 34 is positioned adjacent to the bottom wall 14B of the tube, said coupling 34 connected to an independent gas source providing an inert gas, namely Argon. The inert gas provides a flux throughout the interior of the tube 14, thereby preventing burning of the metal pipes 12.

A nozzle 40 is positioned above the tube top wall 14T, said nozzle 40 connected to the hose 36. The hose 36 feeds the gas into the nozzle 40. A gas lens 42, having a central aperture 44, is mounted on top of the nozzle 40, said nozzle 40 being mateable with the central aperture 44. The gas lens 42 has a side wall 42S encircling said lens 42, wherein a plurality of holes 46 are positioned therearound. When the gas is fed into the gas lens 42, said gas is delivered to the surrounding area in a 360° pattern.

In conclusion, herein is presented a pipe welding tool. The invention is illustrated by example in the drawing figures, and throughout the written description. It should be understood that numerous variations are possible, while adhering to the inventive concept. Such variations are contemplated as being a part of the present invention.

What is claimed is:

1. A pipe welding tool for use within pipes, the pipes having inside walls, comprising:

a center tube, the tube comprising a side wall, a top wall, and a bottom wall;

two or more wall engaging assemblies, each of the two or more assemblies attached to the tube and extending outward therefrom, each assembly having an arm, a roller assembly attached to the arm, said roller assembly having a row of vertically aligned wheels, and a biasing mechanism cooperating with the arms for biasing the roller assembly against the pipe walls;

a hose, the hose extending from the tube top wall to the tube bottom wall, said hose connected to a quick connect coupling adjacent to the bottom wall, wherein the coupling is connected to an independent gas source for providing flux gas to the tool; and a gas delivery head, the gas delivery head situated on the top wall of the tube, said head comprising a nozzle and a gas lens, the nozzle being in communication with the hose and receiving gas therefrom, said nozzle directing gas flow into the gas lens, wherein the gas lens has a central aperture that is mateable with the nozzle, the gas lens further comprising a side wall encircling said lens, wherein a plurality of holes are positioned therearound such that when the gas is emitted from the hose into the nozzle, said gas is released through the gas lens to the surrounding area in a 360 degree planar pattern.

2. The pipe welding tool as recited in claim 1, further comprising an upper clamp and a lower clamp, said clamps extending around the side wall of the tube and supporting the wall engaging assemblies, the upper clamp being fixed to the tube, and the lower clamp being selectively slidable along the tube towards and away from the upper clamp.

3. The pipe welding tool as recited in claim 2, wherein the arm further comprises an inner arm and an outer arm, the inner arm being hingedly connected to the lower clamp at one end, and the opposite end of the inner arm being hingedly connected to one end of the outer arm.

4. The pipe welding tool as recited in claim 3, wherein the biasing mechanism comprises a spring and a pivot arm, the pivot arm extending from the upper clamp to the inner arm, and the spring extending from the upper clamp to the lower clamp, such that the spring is contracted pulling the lower clamp upward toward the upper clamp and the pivot arm biases the inner arm outward away from the tube and towards the pipe wall.

5. The pipe welding tool as recited in claim 4, wherein the wheels of the roller assembly further comprises a pair of parallel bars, the wheels are each mounted between the parallel bars with an axle, all of said axles of the roller assembly are parallel, wherein the wheels slide along the pipe inside walls, allowing the tool to move laterally within the pipe.

* * * * *